United States Patent

[11] 3,607,852

| [72] | Inventors | Wilfried Eichhorn<br>Kelfheim, Taunus;<br>Gerhard Roh, Hofheim, Taunus; Peter<br>Seibel, Frankfurt, Main, all of Germany |
|---|---|---|
| [21] | Appl. No. | 804,933 |
| [22] | Filed | Mar. 6, 1969 |
| [45] | Patented | Sept. 21, 1971 |
| [73] | Assignee | Farbverke Hoechst Aktiengesellschaft<br>Vormals Meister, Lucicic & Bruning<br>Frankfurt am Main, Germany |
| [32] | Priority | Mar. 19, 1968 |
| [33] | | Germany |
| [31] | | P 17 20 806.9 |

[54] VINYL ESTER POLYMERIZATION IN ALCOHOL AND WATER SOLUTION
6 Claims, 3 Drawing Figs.

[52] U.S. Cl........................................................ 260/89.1,
260/91.3 PV
[51] Int. Cl........................................................ C08f 3/54
[50] Field of Search............................................ 260/89.1

[56] References Cited
UNITED STATES PATENTS

| 3,211,712 | 10/1965 | Matsumoto.................. | 260/89.1 |
|---|---|---|---|

FOREIGN PATENTS

| 883,263 | 11/1961 | Great Britian............... | 260/89.1 |
|---|---|---|---|

*Primary Examiner*—Joseph L. Schofer
*Assistant Examiner*—Stanford M. Levin
*Attorney*—Curtis, Morris & Safford

ABSTRACT: A process for the solution polymerization of a vinyl ester in the presence of an alcohol and a free radical polymerization catalyst is shown. Water in controlled amounts is added to the feed mixture of monomer, alcohol and catalyst prior to their entering the first polymerization zone.

VINYL ESTER POLYMERIZATION IN ALCOHOL AND WATER SOLUTION

The present invention relates to a process for the continuous polymerization of vinyl esters in a solution of a monohydric alcohol in the presence of a free radical polymerization catalyst.

It is known for a long time to polymerize vinyl esters in continuous manner in organic solvents, advantageously monohydric aliphatic alcohols. The process is carried out by introducing into a continuously operating apparatus the vinyl ester or esters to be polymerized and a solution of the free radical polymerization catalyst in an alcohol. The monomeric vinyl esters are polymerized at a temperature depending on the temperature of decomposition of the free radical polymerization catalyst (preferably 40 to 100°) until they are completely converted or, in many cases, converted to a certain extent only into the polymer. A further amount of alcohol may then be added continuously and the vinyl ester which has not been polymerized distilled off together with the alcohol over a column. The polyvinyl ester solution obtained is continuously removed. A polymerization of this type can be carried out, for example, in an apparatus as shown in FIG. 1 of the accompanying drawing.

Figure 1:
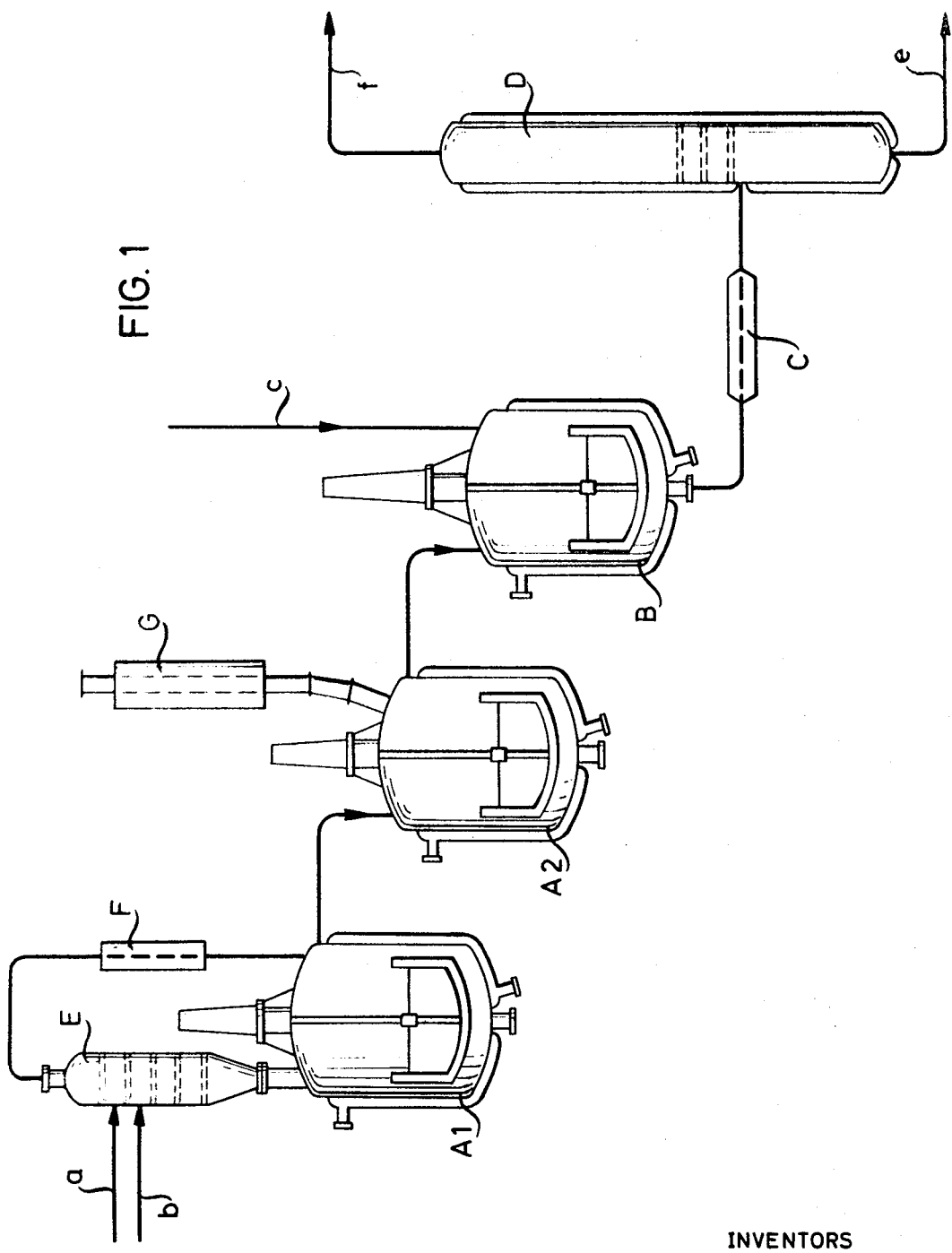

Referring to FIG. 1, A1 and A2 represent heated polymerization reactors, B is an intermediate vessel for metering in further amounts of methanol, C represents a heat exchanger, D is a distilling column, E a preheater for the solutions to be metered in and F and G represent condensers. Vinyl acetate is metered in through conduit $a$, methanol and catalyst are metered in through conduit $b$ and methanol is metered in through conduit $c$. From distilling column D methanolic polyvinyl acetate solution is withdrawn via conduit $e$ and a mixture of vinyl acetate and methanol is removed at $f$.

Instead of the polymerization vessels used in the aforesaid apparatus there may be used tube reactors or a combination of both. Suitable stirrers, installations or conveying screws may be used for thoroughly mixing and conveying the reaction mixture. As vinyl esters there can be used the esters of aliphatic or aromatic carboxylic acids, for example acetic acid vinyl ester (vinyl acetate), propionic acid vinyl ester, butyric acid vinyl ester, nonanoic acid vinyl ester and benzoic acid vinyl ester.

Suitable alcohols are, above all, monohydric aliphatic alcohols having 1 to 4 carbon atoms such as methyl alcohol, ethyl alcohol and the various isomeric types of propyl and butyl alcohol. As free radical polymerization catalyst the known peroxides are used, for example dibenzoyl peroxide and dilauryl peroxide, as well as percarbonates, for example diisopropyl percarbonate, and azo compounds such as azobisisobutyronitrile. The degree of polymerization, the molecular weight of the polymers obtained and the conversion reached depend on the type and amount of alcohol and catalyst used. The alcohol used serves not only as solvent but actively participates in the polymerization as regulator. When small amounts of alcohol and catalyst are used, polyvinyl esters are obtained having high molecular weight.

The process described above has gained some importance in industry for the polymerization of vinyl acetate in methyl alcohol because the methanolic polyvinyl acetate solutions obtained can be subjected to an alcoholysis according to the following equation

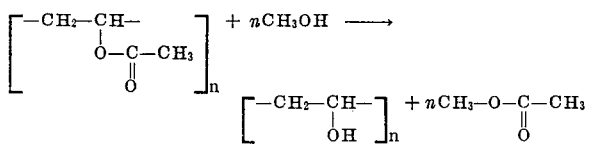

whereby polyvinyl alcohol and methyl acetate are obtained. Polyvinyl alcohol is widely used as high molecular weight water-soluble protective colloid for the manufacture of dispersions of polymers, as thickening agent, as size in textile industries, in the manufacture of paper and as starting material for synthetic fibers. It has been found however, that it is difficult to produce by the process described above polyvinyl alcohols of very high molecular weight (characterized by the viscosity of an aqueous solution of 4 percent strength), which polyvinyl alcohols are especially interesting.

When a high molecular weight polyvinyl alcohol is to be produced, a polyvinyl acetate of a corresponding degree of polymerization must be used which requires small amounts of methyl alcohol. Under these conditions the course of polymerization is strongly influenced by traces of impurities and becomes difficult to control and to reproduce. Hence, polyvinyl alcohol of very high molecular weight cannot be obtained by the above process in satisfactory manner and a safe and riskless continuous polymerization is no longer ensured.

The present invention provides a process for the continuous polymerization of vinyl esters, preferably vinyl acetate, in alcoholic solution in one of the monohydric alcohols as specified above, preferably methyl alcohol, in the presence of free radical polymerization catalysts in known manner, which comprises adding 0.1 to 10 percent by weight of water, preferably 0.2 to 6 percent by weight of water, to the mixture of monomer, alcohol and catalyst before it enters the polymerization zone, the percentages being calculated on the total amount of monomers used. It is surprising that the addition of dosed quantities of water to the polymerization mixture considerably increases the molecular weight of the polyvinyl ester or the viscosity characterizing the molecular weight of the aqueous polyvinyl alcohol solutions obtained therefrom. Simultaneously, the reproducibility of the process is greatly improved so that it is very suitable for the manufacture of high molecular weight polyvinyl esters and alcohols. The advantage of the improved reproducibility of the continuous solution polymerization with the addition of water is maintained even if higher amounts of alcohol and catalyst are used to produce polyvinyl esters or alcohols of lower molecular weight. The water may be added to the polymerization mixture in the liquid state prior to polymerization or it may be introduced in the form of steam into the reactor or into a heater connected in series therewith. In the latter case the condensation heat of the steam may be used to preheat the mixture to be polymerized.

The process of the invention can be carried out in one reaction vessel or in several reactors in cascade connection. Tube-shaped reactors or a combination of both types optionally provided with suitable means for mixing and conveying the reaction mixture may also be used.

The following Examples serve to illustrate the invention but they are not intended to limit it thereto.

Figure 2:
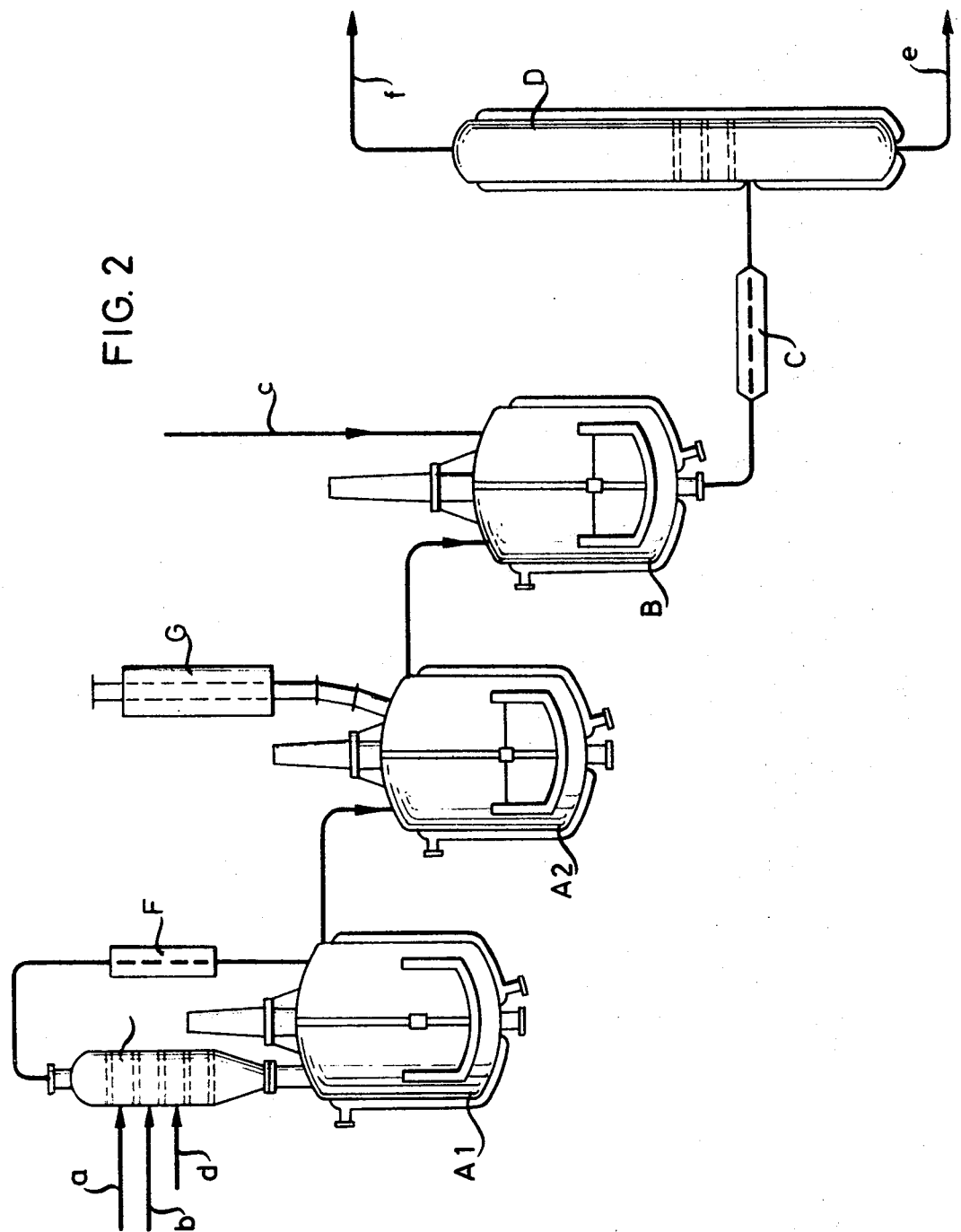

Comparative Examples 1 to 3 describe a process for the continuous polymerization of vinyl acetate in methanolic solution by a conventional method in an apparatus as shown in FIG. 1 of the accompanying drawing. Examples 1 to 4 illustrate the continuous polymerization of vinyl acetate in methanolic solution by the process of the invention with the addition of dosed quantities of water carried out in an apparatus as shown in FIG. 2. The apparatus of FIG. 2 is identical with that of FIG. 1, with the sole exception that $d$ represents an inlet pipe through which water or steam are added to the reaction mixture. It is likewise possible, of course, to add the water or steam through conduits $a$ or $b$.

COMPARATIVE EXAMPLE 1

70 Kilograms per hour of a mixture containing 7.5 parts by weight of methyl alcohol and 0.010 part by weight of azobisisobutyronitrile (AIBN) for 100 parts by weight of vinyl acetate were introduced while stirring into the first 200 liter reactor of stainless steel of the apparatus shown in FIG. 1.

After 4 hours dosing was interrupted, the mixture was heated to an internal temperature of 62–64° C. with a jacket temperature of 70 to 80° C. and prepolymerized for 3 hours while maintaining a slight reflux. The jacket heating was then switched off and the metering in of the mixture was continued. Simultaneously, 102 kilograms of methyl alcohol were introduced per hour into the container intercalated between the polymerization reactors and the apparatus in which distillation was carried out which container was equipped with stirrer and water cooling, and the distillation was started. The equilibrium of the continuous process was reached after about 24 hours at a reaction temperature of 64° C. and with a weak reflux. The content of solid polyvinyl acetate in the second polymerization reactor and in the polyvinyl acetate solution continuously withdrawn from the column was about 30 percent. At the head of the column a mixture of 58 kilograms of methanol and 44 kilograms of vinyl acetate was distilled off per hour. The polymerization was continued for 3 days. Every 6 hours, the "saponification viscosity" of samples of the polyvinyl acetate solution was determined by the method specified below. The saponification viscosity of the polyvinyl acetate obtained, defined as the viscosity of a 4 percent aqueous polyvinyl alcohol solution obtained by alcoholysis was 49 to 63 centipoises.

Determination of the saponification viscosity: 150 g. of the methanolic polyvinyl acetate solution were diluted with 1000 milliliters of methyl alcohol and subjected to alcoholysis in a 2 liter flask while stirring in the presence of 36 milliliters of methanolic sodium hydroxide solution of 15 percent strength. After 2½ hours the sodium hydroxide was neutralized with a solution of 8 milliliters of acetic acid of 90 percent strength in 50 milliliters of methanol. The precipitated polyvinyl alcohol was filtered off with suction, washed with 100 milliliters of methanol and dried at 60° C. in a vacuum drier. Next a 4 percent aqueous solution of the polyvinyl alcohol was prepared and its viscosity was measured in a Hoppler viscosimeter at 20° C.

COMPARATIVE EXAMPLE 2

The solution polymerization was carried out as described in comparative Example 1 with the exception that the mixture metered into the reactor contained 9.4 parts by weight of methyl alcohol and 0.017 part by weight of AIBN for 100 parts by weight of vinyl acetate. Under these conditions the polyvinyl acetate had a saponification viscosity of 47 to 54 centipoises.

COMPARATIVE EXAMPLE 3

The solution polymerization was carried out as described in comparative Example 1 with the exception that the mixture metered into the reactor contained 6.4 parts by weight of methyl alcohol and 0.010 part by weight of AIBN for 100 parts by weight of vinyl acetate. Under these conditions the polyvinyl acetate had a saponification viscosity of 53 to 68 centipoises.

EXAMPLES 1 TO 4

The solution polymerization was carried out in the manner described in comparative Examples 2 and 3 in an apparatus according to FIG. 2. Varying amounts of water were added to the mixture to be polymerized. In Example 1 steam was metered into the reactor. In all cases the resulting saponification viscosities under comparable conditions were considerably higher than in comparative Examples 2 and 3 without the addition of water.

The compositions of the polymerized mixtures and the saponification viscosities obtained are summarized in the following table. The two values indicated in the column for the saponification viscosity are extreme values of samples taken every 6 hours in a run of 3 days. The conversion defined as the ratio of polyvinyl acetate /vinyl acetate + polyvinyl acetate × 100
was in the range of from 32 to 33 percent in the comparative Examples 1 to 3 and in Examples 1 to 4 of the invention.

TABLE

| | Parts by weight for 100 parts by weight of vinyl acetate | | | Saponification viscosity of 4% solution in water (cp.) |
|---|---|---|---|---|
| | Methanol | AIBN | Water | |
| Comparative Example: | | | | |
| 1 | 7.50 | 0.010 | | 49–63 |
| 2 | 9.40 | 0.017 | | 47–54 |
| 3 | 6.40 | 0.010 | | 53–68 |
| Example: | | | | |
| 1 | 9.40 | 0.017 | 0.5 | 59–62 |
| 2 | 9.40 | 0.017 | 1.69 | 76–84 |
| 3 | 6.40 | 0.010 | 1.10 | 83–90 |
| 4 | 6.40 | 0.010 | 1.10 | 82–91 |

Figure 3:
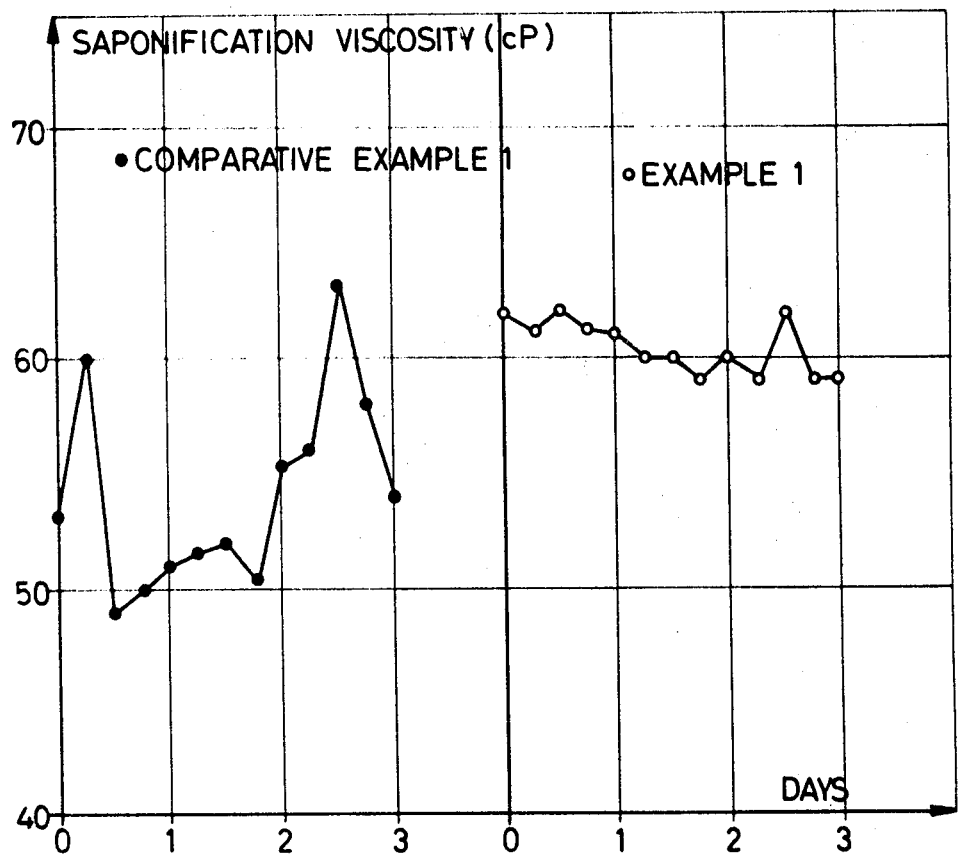

FIG. 3 of the accompanying drawing demonstrates the improved reproducibility of the saponification viscosity when water is added to the polymerization mixture. The values were measured with products of comparative Example 1 and products of Example 1 having comparable saponification viscosities. With an average saponification viscosity of 54 centipoises the mean deviations of the values of the samples of the product of comparative Example 1 were ±4.0 centipoises whereas the mean deviations of the individual samples of the product of Example 1 according to the invention were ±1.2 centipoises with an average saponification viscosity of 60 centipoises.

What is claimed is:

1. In the process for the continuous polymerization of vinyl esters in alcoholic solution of a monohydric alcohol in the presence of a free radical polymerization catalyst, the improvement of: adding to the mixture of monomer, alcohol and free radical polymerization catalyst, prior to entering the first polymerization zone, 0.1 to 10 percent by weight of water, calculated on the amount of vinyl acetate.

2. The process of claim 1, wherein the water is added in the form of steam.

3. The process of claim 1 wherein 0.2 to 3 percent by weight of water are added.

4. The process of claim 1, wherein the vinyl ester is vinyl acetate.

5. The process of claim 1, wherein the monohydric alcohol is methyl alcohol.

6. The process of claim 1, wherein the free radical polymerization catalyst is azobisisobutyronitrile.